US012644407B2

(12) United States Patent
Wang et al.

(10) Patent No.: US 12,644,407 B2
(45) Date of Patent: Jun. 2, 2026

(54) TRACTOR AIRCRAFT POWER PLANT WITH SWIRL RECOVERY VANES

(71) Applicant: PRATT & WHITNEY CANADA CORP., Longueuil (CA)

(72) Inventors: Xi Wang, Montréal (CA); Jean Thomassin, Ste-Julie (CA); Michael Lanktree, La Prairie (CA); Pierre Bertrand, St-Patrice-de-Sherrington (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/948,706

(22) Filed: Nov. 15, 2024

(65) Prior Publication Data

US 2026/0139618 A1     May 21, 2026

(51) Int. Cl.
*F02B 53/14*          (2006.01)
*B64D 35/00*          (2006.01)
(Continued)

(52) U.S. Cl.
CPC .............. *F02B 53/14* (2013.01); *B64D 35/00* (2013.01); *F16H 57/02* (2013.01); *F02B 2053/005* (2013.01); *F16H 2057/02043* (2013.01)

(58) Field of Classification Search
CPC .... F02B 53/14; F02B 2053/005; B64D 35/00; F16H 57/02; F16H 2057/02043;
(Continued)

(56) References Cited

U.S. PATENT DOCUMENTS

| 10,017,270 B2 | 7/2018 | Becker et al. |
| 11,391,298 B2 | 7/2022 | Miller et al. |

(Continued)

FOREIGN PATENT DOCUMENTS

WO          2023170357 A1     9/2023

OTHER PUBLICATIONS

Propeller Aerodynamics, Counter & Contra-rotating Props, Feb. 7, 2016, heli-air.net/2016/02/07/counter-amp-contra-rotating-props/, accessed on Oct. 15, 2024.

(Continued)

*Primary Examiner* — Elton K Wong
(74) *Attorney, Agent, or Firm* — Norton Rose Fulbright Canada LLP

(57)          ABSTRACT

A tractor aircraft power plant for propelling an aircraft is described. The tractor aircraft power plant is configured to improve serviceability of swirl-recovery vanes. The tractor aircraft power plant includes an intermittent combustion engine such as a Wankel engine operable to generate motive power. A bladed rotor is drivingly coupled to the Wankel engine and is disposed forward of the Wankel engine relative to a propulsion direction. A gearbox drivingly couples the bladed rotor to the Wankel engine. A plurality of vanes are angularly distributed about a rotation axis of the bladed rotor and are non-rotatable about the rotation axis of the bladed rotor. The vanes are disposed aft of the bladed rotor to interact with a flow of air propelled by the bladed rotor during rotation of the bladed rotor. The vanes are mounted to the gearbox to facilitate serviceability of the vanes.

19 Claims, 5 Drawing Sheets

(51) Int. Cl.
   *F02B 53/00*     (2006.01)
   *F16H 57/02*     (2012.01)
(58) Field of Classification Search
   CPC .......... F01D 17/16; F01D 17/162; F02K 3/06;
                                               F05D 2230/70
   See application file for complete search history.

(56)             References Cited

U.S. PATENT DOCUMENTS

| | | | | |
|---|---|---|---|---|
| 11,719,166 | B1 * | 8/2023 | Freer ........................ | F02C 5/00 |
| | | | | 415/122.1 |
| 12,234,745 | B1 * | 2/2025 | Kray ........................ | F01D 7/00 |
| 2015/0226116 | A1 * | 8/2015 | Major ....................... | F02C 7/20 |
| | | | | 29/888.011 |
| 2018/0328288 | A1 * | 11/2018 | Lemarchand ......... | F01D 25/162 |
| 2022/0302801 | A1 * | 9/2022 | Osama ................... | H02K 11/02 |
| 2024/0017841 | A1 | 1/2024 | Freer | |
| 2024/0017842 | A1 | 1/2024 | Freer | |
| 2024/0017847 | A1 | 1/2024 | Freer | |
| 2024/0092491 | A1 | 3/2024 | Dussault | |

OTHER PUBLICATIONS

Wikipedia, Antonov An-70, https://en.wikipedia.org/wiki/Antonov_An-70#, accessed on Oct. 15, 2024.

Wikipedia, Pratt & Whitney/Allison 578-DX, https://en.wikipedia.org/wiki/Pratt_%26_Whitney/Allison_578-DX, accessed on Oct. 15, 2024.

Mary L. Dudy, How RISE Arose: The Story Behind Decades of Innovations That Bring CFM to a Pivotal Moment, Jun. 18, 2023, Rise Program/GE News, https://www.ge.com/news/taxonomy/term/9159, accessed on Oct. 15, 2024.

Jon Hemmerdinger, GE Aviation to become GE Aerospace, reflecting expansion plan, FlightGlobal, Jul. 18, 2022, https://www.flightglobal.com/farnborough-2022/ge-aviation-to-become-ge-aerospace-reflecting-expansion-plan/149442.article, accessed on Oct. 15, 2024.

FREE3D, Embraer Fma 123 Cba Vector 3D Model, (https://srv.carbonads.net/ads/click/x/GTND427LF6YD6K37 ADS via Carbon (HT TP://CARBONADUTM_SOURCE=FREE3DCOM&UTM_MED, accessed on Oct. 15, 2024.

EBAY, Garrett TPF351-20 Turboprop Aero Engine Brochure Regional Airliner, Jun. 1990, https://www.ebay.ca/itm/295802734476, accessed on Oct. 15, 2024.

Flightglobal, Garrett TPF351-20 Cutaway Drawing, https://www.flightglobalimages.com/cutaways/aeroengines-piston-cutaways/garrett-tpf351-20-cutaway-drawing-1569881.html, accessed on Oct. 15, 2024.

The Avio Aero People's Magazine, Together We Rise, Aug. 2021, https://magazineabout.com/future/together-we-rise, accessed on Oct. 15, 2024.

Anonymous, Unique "Grim's Vane Wheel" Propulsion System on the Siem Curie, Jan. 20, 2020, https://siemshipmanagement.pl/content_news/unique-grims-vane-wheel-system-the-siem-curie, accessed Oct. 16, 2024.

Joel N., Constant Speed Propellers Explained, Nov. 9, 2020, https://www.century-of-flight.net/constant-peed-propellers-explained/, accessed on Nov. 13, 2024.

* cited by examiner

FORWARD

AFT

1000

1002

Uninstalling a propeller of a tractor aircraft power plant.

1004

Uninstalling the swirl recovery vanes from the tractor aircraft power plant by disassembling the vanes from a gearbox; and/or installing the swirl recovery vanes onto the tractor aircraft power plant by assembling the vanes to a gearbox.

TRACTOR AIRCRAFT POWER PLANT WITH SWIRL RECOVERY VANES

TECHNICAL FIELD

The disclosure relates generally to aircraft power plants, and more particularly to aircraft power plants having a tractor configuration.

BACKGROUND

An aircraft power plant typically has an engine and propulsion device such as a propeller that is driven by the engine. The propulsive efficiency of an aircraft power plant can be improved through the use of contra-rotating propellers but such configuration can be associated with a high level of noise. Improvement is desirable.

SUMMARY

In one aspect, the disclosure describes a tractor aircraft power plant for propelling an aircraft. The tractor aircraft power plant comprises:

a Wankel engine operable to generate motive power;

a bladed rotor drivingly coupled to the Wankel engine and being disposed forward of the Wankel engine relative to a propulsion direction of the tractor aircraft power plant;

a gearbox drivingly coupling the bladed rotor to the Wankel engine; and a plurality of vanes angularly distributed about a rotation axis of the bladed rotor and being non-rotatable about the rotation axis of the bladed rotor, the vanes being disposed aft of the bladed rotor to interact with a flow of air propelled by the bladed rotor during rotation of the bladed rotor, the vanes being mounted to the gearbox.

The gearbox may include a housing and the vanes may be mounted to the housing of the gearbox.

The gearbox may be disposed radially inward of the vanes. An axial position of the vanes along the rotation axis of the bladed rotor may coincide with an axial position of the gearbox.

The vanes may be pivotally mounted to a radially outer housing of the gearbox.

The gearbox may be disposed forward of a nacelle housing the Wankel engine.

The Wankel engine may be housed inside a nacelle having an air inlet for receiving ambient air therein to facilitate a combustion process of the Wankel engine. The gearbox may be disposed forward of the air inlet.

The Wankel engine may have an output shaft for delivering the motive power to the bladed rotor via the gearbox. The bladed rotor may be mounted to a rotor shaft rotatable about the rotation axis of the bladed rotor. The output shaft and the rotor shaft may be coaxial.

The Wankel engine may have an output shaft for delivering the motive power to the bladed rotor via the gearbox. The bladed rotor may be mounted to a rotor shaft rotatable about the rotation axis of the bladed rotor. The output shaft and the rotor shaft may be parallel.

The bladed rotor and the vanes may be open.

The vanes may have a variable pitch.

Embodiments may include combinations of the above features.

In another aspect, the disclosure describes a tractor aircraft power plant for generating thrust for propelling an aircraft. The tractor aircraft power plant comprises:

an intermittent combustion engine operable to generate motive power;

a propeller drivingly coupled to the intermittent combustion engine and being disposed forward of the intermittent combustion engine relative to a thrust direction of the tractor aircraft power plant;

a gearbox drivingly coupling the propeller to the intermittent combustion engine; and a circular array of swirl-recovery vanes coaxial with a rotation axis of the propeller and non-rotatable about the rotation axis of the propeller, the swirl-recovery vanes being disposed aft of the propeller to interact with a flow of air exiting the propeller during rotation of the propeller, the swirl-recovery vanes being mounted to a housing of the gearbox.

The intermittent combustion engine may be a Wankel engine.

The gearbox may be disposed forward of a nacelle housing the Wankel engine.

The housing of the gearbox may be disposed centrally of the circular array of swirl-recovery vanes.

The swirl-recovery vanes may be pivotally mounted to a radially outer wall of the gearbox.

The swirl-recovery vanes may have a variable pitch.

The intermittent combustion engine may be drivingly coupled to an output shaft for delivering the motive power to the gearbox. The propeller may be mounted to a propeller shaft rotatable about the rotation axis of the propeller and drivingly coupled to the output shaft via the gearbox. The gearbox may provide a speed reduction from the output shaft to the propeller shaft. The gearbox may be disposed centrally of the circular array of swirl-recovery vanes and axially coincident with the swirl-recovery vanes.

The intermittent combustion engine may be a Wankel engine. The swirl-recovery vanes may be pivotally mounted to a radially outer wall of the gearbox.

Embodiments may include combinations of the above features.

In a further aspect, the disclosure describes a method of servicing a tractor aircraft power plant having an intermittent combustion engine, a bladed rotor drivingly coupled to the intermittent combustion engine via a gearbox and disposed forward of the intermittent combustion engine, and a plurality of swirl-recovery vanes disposed aft of the bladed rotor to interact with a flow of air exiting the bladed rotor during rotation of the bladed rotor. The method comprises:

uninstalling the swirl-recovery vanes from the tractor aircraft power plant by disassembling the swirl-recovery vanes from a housing of the gearbox.

Uninstalling the swirl-recovery vanes may be performed without accessing a nacelle housing the intermittent combustion engine.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The present disclosure describes tractor aircraft power plants having swirl-recovery vanes and methods of servicing such tractor aircraft power plants. In some embodiments, the swirl-recovery vanes may improve propulsive efficiency without significantly increasing propeller noise. In some embodiments, the configuration of the swirl-recovery vanes in a tractor configuration as described herein may facilitate servicing of the tractor aircraft power plant by facilitating the removal, installation and/or replacement of the swirl-recovery vanes as a line replaceable unit (LRU) that does not require extensive disassembly of the remainder of the tractor aircraft power plant. For example, the configuration of the swirl-recovery vanes described herein may facilitate the removal, installation and/or replacement of the swirl-recovery vanes without needing to access an enclosure (e.g., nacelle) of an intermittent combustion (e.g., Wankel) engine of the tractor aircraft power plant.

Aspects of various embodiments are described through reference to the drawings. The terms "coupling", "securing" and "mounting" may respectively include both direct coupling, securing and mounting (in which two elements contact each other) and indirect coupling, securing and mounting (in which at least one additional element is located between the two elements). The term "substantially" as used herein may be applied to modify any quantitative representation which could permissibly vary without resulting in a change in the basic function to which it is related. As used herein, the singular forms "a," "an," and "the" are intended to include the plural forms as well, unless the context clearly indicates otherwise.

Figure 1:
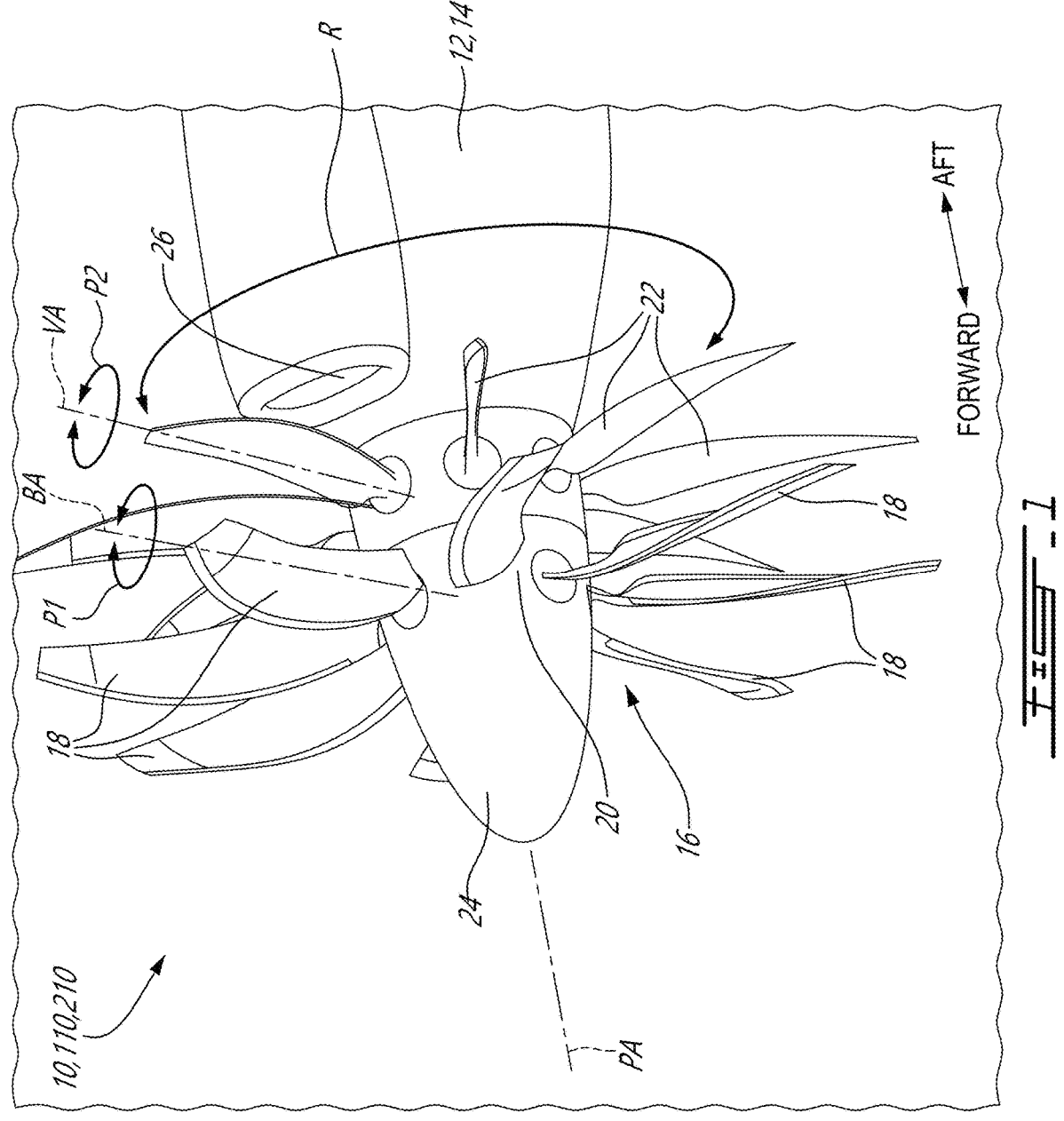
FIG. 1 is a perspective view of part of a tractor aircraft power plant.

FIG. 1 is a perspective view of part of an exemplary tractor aircraft power plant 10 (referred hereinafter as "power plant 10") having a tractor configuration. Power plant 10 may include Wankel engine 12 operable to generate motive power. Wankel engine 12 may be an intermittent internal combustion engine using an eccentric rotary design to convert pressure into rotary motion (i.e., motive power). In some embodiments, Wankel engine 12 may be incorporated into a compound cycle engine of a type described in U.S. Pat. No. 10,107,195 (Title: COMPOUND CYCLE ENGINE), which is incorporated by reference herein. Such compound cycle engine including Wankel engine 12 may be used to drive propeller 16 or other bladed rotor of power plant 10. In some embodiments, Wankel engine 12 may be integrated (e.g., combined) with one or more elements of the power plant of U.S. Pat. No. 11,866,181 (title: AIRCRAFT POWER PLANT), which is incorporated by reference herein. Wankel engine 12 may operate on a suitable fuel (e.g. diesel, kerosene (jet fuel) and suitable biofuel) and air.

For example, Wankel engine 12 may be incorporated in a thermodynamic cycle including a first combustion stage occurring in Wankel engine 12 and a second combustion stage (e.g., inter-burner) occurring using the exhaust gas downstream of the Wankel engine 12. As a result, additional motive power can be produced with the second combustion stage from unused/unburnt air from the first combustion stage. The hot gas resulting from the second combustion stage may be delivered to a recovery turbine. The motive power recovered from the turbine may be used to compress air for the Wankel engine 12 and compounded (e.g., through a hydraulic power transfer) to an output shaft. Such mechanical arrangement may allow the combination of the power output from the Wankel engine and the recovery turbine to drive a single output shaft.

Wankel engine 12 is referenced herein as an exemplary prime mover for power plant 10 but it is understood that other types of intermittent combustion engines may be suitable for use in power plant 10. Examples of intermittent combustion engines suitable for power plant 10 may include a reciprocating (e.g., piston) engine or a pistonless rotary engine. The term "intermittent combustion engine" is intended to encompass combustion (i.e., heat) engines characterized by periodic ignition of fuel and air, as opposed to a continuous combustion engine such as a gas turbine engine that is characterized by a steady flow of fuel and air into the engine, and a stable flame maintained within the engine.

Wankel engine 12 may be partially or entirely housed inside enclosure 14, which may be an engine casing or a streamlined container (e.g., nacelle) that is configured to interact with a flow of ambient air outside of power plant 10 during operation of power plant 10. Power plant 10 may include propeller 16 or other bladed rotor drivingly coupled to and driven by Wankel engine 12. Propeller 16 may be disposed forward of Wankel engine 12 relative to a direction of propulsion (e.g., thrust direction) of power plant 10. Propeller 16 may be disposed forward of enclosure 14. The general direction of propulsion is labeled as "FORWARD" in FIG. 1 and the opposite direction is labeled as "AFT" in FIG. 1.

Propeller 16 may include a plurality of propeller blades 18 that are angularly distributed about hub 20 and also secured to hub 20. Propeller blades 18 and hub 20 may be rotatable together about propeller axis PA in the direction of arrow R. The rotation of propeller 16 may generate thrust to propel an aircraft in the FORWARD direction. Propeller axis PA may correspond to a rotation axis of propeller 16. In various embodiments, propeller blades 18 may have a fixed pitch or a variable pitch. For example, each propeller blade 18 may have a respective blade axis BA (only one instance being shown in FIG. 1 for clarity) oriented radially relative to propeller axis PA so that each propeller blade 18 may be controllably rotatable about its blade axis BA in the direction of arrow P1 to vary its pitch for example. In various embodiments, power plant 10 may include another type of (e.g., ducted or open (i.e., unducted, unshrouded) bladed rotor instead or in addition to propeller 16 for propelling the aircraft. Such bladed rotor may be a ducted fan or a propfan for example.

Power plant 10 may include a plurality of swirl-recovery vanes 22 (referred hereinafter as "vanes 22") angularly distributed about propeller axis PA of propeller 16. In other words, vanes 22 may be arranged in a circular array that is coaxial with propeller axis PA of propeller 16. Vanes 22 may be non-rotatable (i.e., fixed) about propeller axis PA of propeller 16. Vanes 22 may be disposed aft of propeller 16 and axially adjacent to propeller 16 so that vanes 22 may interact with a flow of air propelled by (i.e., exiting) propeller 16 during rotation of propeller 16. Vanes 22 may be configured and positioned adjacent to propeller 16 so that, during rotation of propeller 16, vanes 22 may improve the propulsive efficiency by recovering some of the swirl in the slipstream of propeller 16. In other words, vanes 22 may convert rotational kinetic energy in the slipstream of propeller 16 into axial velocity toward the AFT direction to increase the thrust and efficiency of propeller 16. For example, in some embodiments, the presence of vanes 22 may allow a higher thrust rating to be achieved for propeller 16 of a particular size. In other words, the presence of vanes 22 may allow the thrust rating of propeller 16 to be increased and be equivalent to a thrust rating of a single propeller of a larger diameter.

In various embodiments, vanes 22 may have a fixed pitch or a variable pitch. For example, each vane 22 may have a respective vane axis VA (only one instance being shown in FIG. 1 for clarity) oriented radially relative to propeller axis PA so that each vane 22 may be controllably rotatable about its vane axis VA in the direction of arrow P2 to vary its pitch for example. In various embodiments, vanes 22 may be ducted or open (i.e., unducted, unshrouded).

In some embodiments, power plant 10 may include spinner 24 that is disposed forward and centrally of propeller 16. Spinner 24 may be a streamlined fairing fitted over a hub of propeller 16 and coaxial with propeller axis PA.

Power plant 10 may include air inlet 26 defined in enclosure 14 and that leads to a combustion chamber of Wankel engine 12, and exhaust outlet 27 (shown in FIG. 2), which discharges exhaust gas into the ambient environment. Air inlet 26 may be disposed aft of propeller 16 and also aft of vanes 22. Air inlet 26 may be oriented toward the FORWARD direction to receive air that is discharged from propeller 16. Vanes 22 may be disposed aft of propeller 16, forward of Wankel engine 12 and also forward of enclosure 14, which may be a nacelle.

Figure 2:
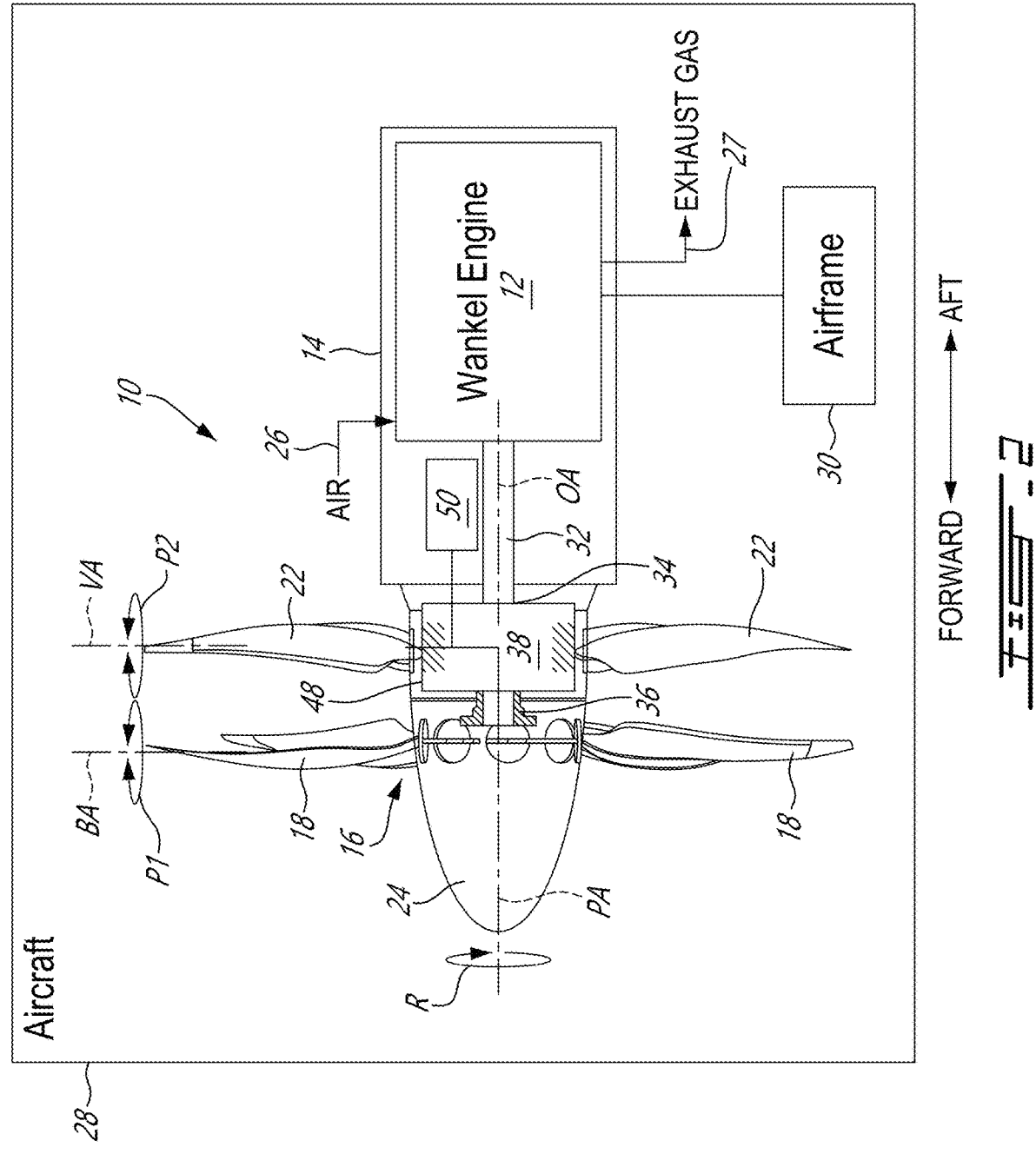
FIG. 2 is a schematic view of an exemplary configuration of the tractor aircraft power plant of FIG. 1.

FIG. 2 is a schematic view of an exemplary configuration of power plant 10 integrated in aircraft 28 (shown schematically). FIG. 2 includes an axial cross-sectional view through propeller 16 and through a circular array of vanes 22. Aircraft 28 may be any type of manned or unmanned aircraft (e.g., drones) such as corporate, private, commercial and passenger aircraft. In some embodiments, aircraft 28 may be a fixed-wing aircraft including one or more power plants 10 mounted thereto for propelling aircraft 28 in the FORWARD direction. Aircraft 28 may include airframe 30 to which Wankel engine 12 may be mounted via suitable structure such as a pylon for example. In various embodiments of aircraft 28, power plant 10 may be mounted to and supported by a fuselage or to a wing of aircraft 28.

Wankel engine 12 may drive output shaft 32, which may in turn drive propeller shaft 36 and propeller 16. In other words, Wankel engine 12 may include or be drivingly connected to output shaft 32 for delivering the motive power to propeller 16. Output shaft 32 may extend through enclosure 14 and out of enclosure 14 in the FORWARD direction. For example, output shaft 32 may have forward end 34 thereof that is disposed out of enclosure 14 and forward of enclosure 14. Output shaft 32 may be rotatable about output axis OA.

Figure 3:
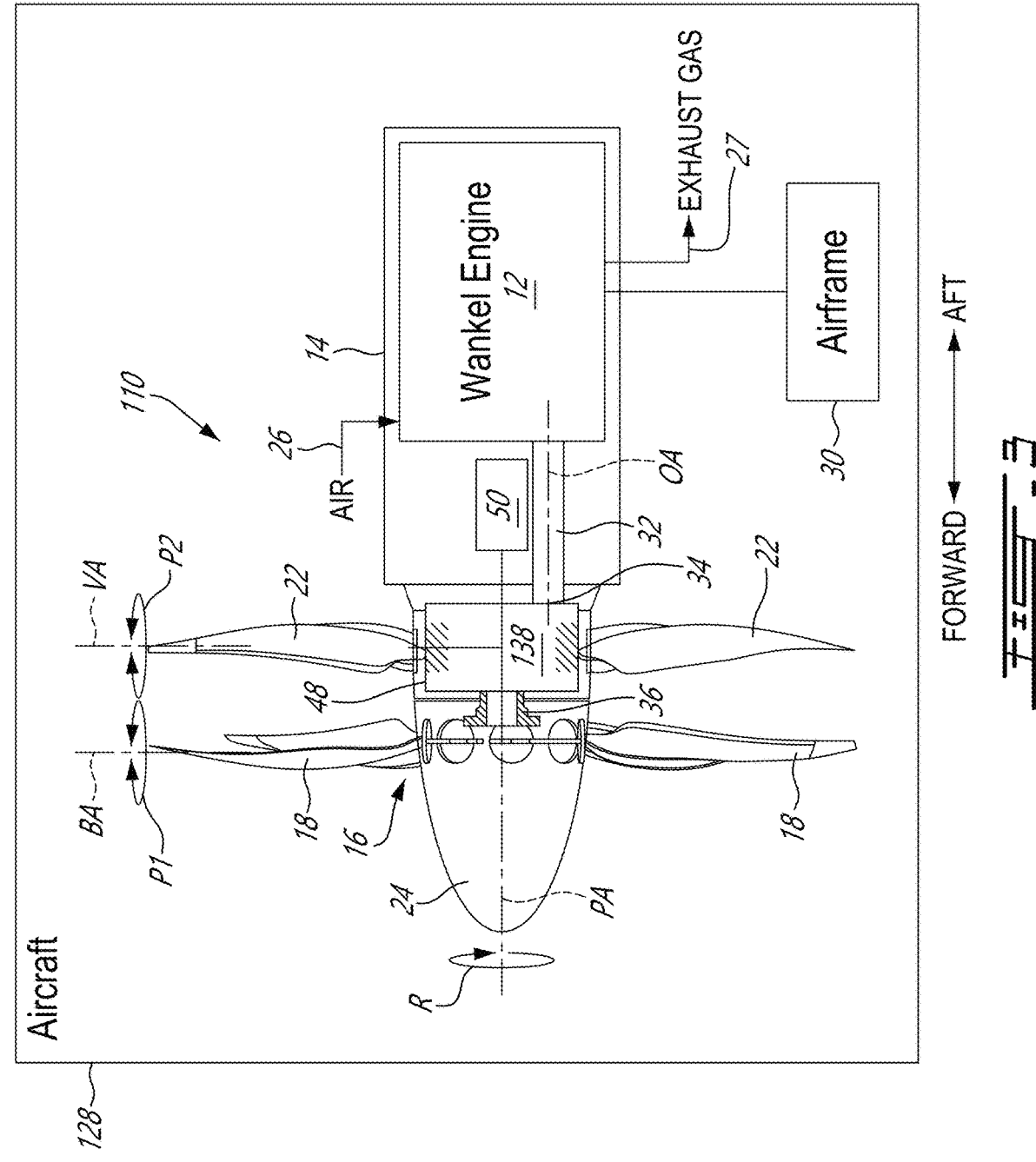
FIG. 3 is a schematic view of another exemplary configuration of the tractor aircraft power plant of FIG. 1.

Propeller 16 may be mounted (e.g., fastened) to propeller shaft 36 (or bladed rotor shaft) rotatable about propeller axis PA. Accordingly, propeller 16 may rotate with propeller shaft 36. Output shaft 32 and propeller shaft 36 may be coaxial as shown in FIG. 2 or non-coaxial as shown in FIG. 3. Output shaft 32 and propeller shaft 36 may be parallel. Propeller shaft 36 may be hollow and may define a central passage extending axially therethrough.

Output shaft 32 may be in torque-transmitting engagement with propeller shaft 36 via gearbox 38. In some embodiments, gearbox 38 may provide a speed reduction function so that propeller shaft 36 may rotate at a slower rotational speed than output shaft 32. In other words, gearbox 38 may be a speed reduction gearbox in some embodiments. Forward end 34 of output shaft 32 may extend into gearbox 38. For example, propeller shaft 36 may be drivingly coupled to output shaft 32 via a first (e.g., smaller) gear driven by output shaft 32 and meshed with a second (e.g., larger) gear driving propeller shaft 36. In some embodiments, output shaft 32 may drive propeller shaft 36 via an epicyclic gear set or other type of gear set that is housed inside of gearbox 38.

Vanes 22 may be mounted (e.g., fastened) to suitable non-rotating structure, which may be part of enclosure 14 (e.g., nacelle or other casing of Wankel engine 12), or which may be part of gearbox 38. In some embodiments, gearbox 38 may be disposed forward of enclosure 14 housing Wankel engine 12. In some embodiments, gearbox 38 may be disposed forward of air inlet 26. In some embodiments, gearbox 38 may be disposed radially inwardly of vanes 22 and an axial position of vanes 22 along propeller axis PA may coincide with an axial position of gearbox 38. For example, housing 48 of gearbox 38 may be disposed centrally of the circular array of vanes 22 and be axially coincident with vanes 22. Gearbox 38 may be disposed axially between propeller 16 and enclosure 14.

In some embodiments, vanes 22 may be mounted to housing 48 (e.g., wall) of gearbox 38 or to other part(s) of gearbox 38. In other words, vanes 22 may be supported by gearbox 38. For example, housing 48 of gearbox 38 may be part of a load path between vanes 22 and other structure (e.g., chassis, enclosure 14) of power plant 10. In embodiments where vanes 22 have a variable pitch, vanes 22 may be pivotally mounted to gearbox 38. In embodiments where gearbox 38 is disposed centrally of vanes 22, vanes 22 may be (e.g., pivotally) mounted to a radially outer wall of housing 48 of gearbox 38. In some embodiments, roots of vanes 22 may be mounted to housing 48 of gearbox 38 by way of a crown to permit a collective pitch control of vanes 22

Power plant 10 may include one or more pitch actuators 50 operatively connected to propeller blades 18 and/or to vanes 22. In embodiments where propeller blades 18 have a variable pitch, pitch actuator(s) 50 may be operable to cause propeller blades 18 to rotate about their respective blade axes BA as shown by arrow P1. In embodiments where vanes 22 have a variable pitch, pitch actuator(s) 50 may be operable to cause vanes 22 to rotate about their respective vane axes VA as shown by arrow P2. Pitch actuator(s) 50 may be hydraulically driven (e.g., include a hydraulic cylinder) or ballscrew driven. The collective pitch of vanes 22 may be synchronized by a linear movement of a hydraulically driven collective plate.

FIG. 3 is a schematic view of another exemplary configuration of tractor aircraft power plant 110 (referred hereinafter as "power plant 110"). Power plant 110 may be operable to propel aircraft 128. Power plant 110 may include elements of power plant 10 previously described above and like elements are identified using like reference numerals. Propeller 16 may be mounted to propeller shaft 36 which may be drivingly coupled to output shaft 32 via gearbox 138. Gearbox 138 may be disposed forward of enclosure 14 of Wankel engine 12. Gearbox 138 may be disposed axially between propeller 16 and enclosure 14. In contrast with power plant 10, output axis OA of output shaft 32 and propeller axis PA of propeller shaft 36 may be substantially parallel but spaced apart from each other. For example, propeller shaft 36 may be radially offset from output shaft 32 driven by Wankel engine 12. Vanes 22 may be (e.g., pivotally) mounted to a (e.g., radially outer) wall of housing 48 of gearbox 38.

Figure 4:
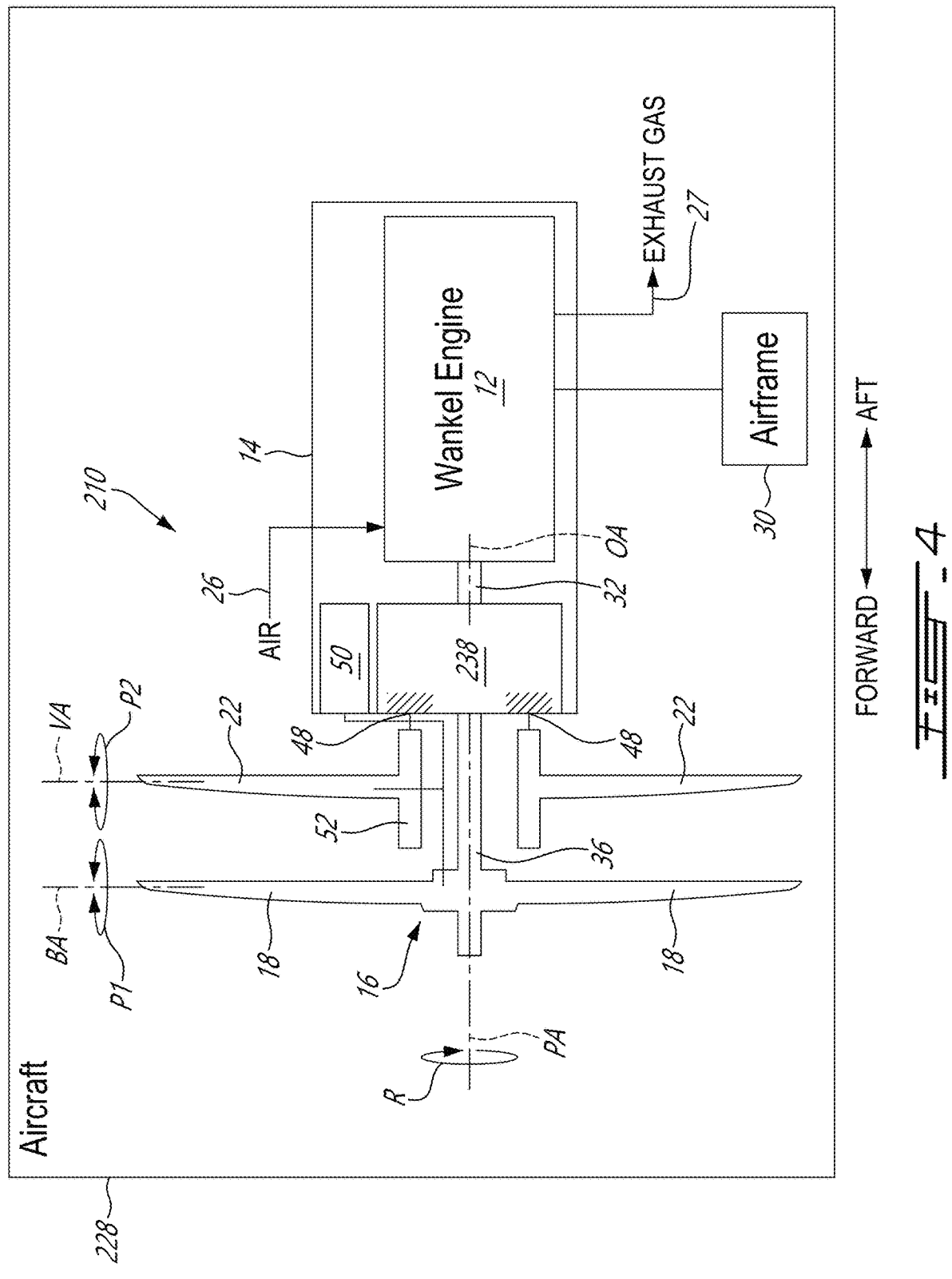
FIG. 4 is a schematic view of another exemplary configuration of the tractor aircraft power plant of FIG. 1.

FIG. 4 is a schematic view of another exemplary configuration of tractor aircraft power plant 210 (referred hereinafter as "power plant 210"). Power plant 210 may be operable to propel aircraft 228. Power plant 210 may include elements of power plants 10 and 110 previously described above and like elements are identified using like reference numerals. Propeller 16 may be mounted to propeller shaft 36 which may be drivingly coupled to output shaft 32 via gearbox 238. Gearbox 238 may be disposed axially aft of vanes 22. In other words, vanes 22 may be disposed axially between propeller 16 and gearbox 238. Gearbox 238 may be disposed forward of or within enclosure 14 (e.g., nacelle) of Wankel engine 12. Output axis OA of output shaft 32 and propeller axis PA of propeller shaft 36 may be coaxial or non-coaxial.

Vanes 22 may be (e.g., pivotally) mounted to non-rotatable vane shaft 52. Vane shaft 52 may be hollow and define a central passage extending axially therethrough. Rotatable propeller shaft 36 may extend axially through vane shaft 52. Vane shaft 52 may be fixedly mounted to gearbox 238, to enclosure 14 or to other suitable structure of power plant 210. In some embodiments, vane shaft 52 may be mounted (e.g., fastened) to a (e.g., forward facing) wall of housing 48 of gearbox 238. In some embodiments, vane shaft 52 may be mounted to a suitable interface disposed inside of gearbox 238. Vanes 22 may be supported by gearbox 238 via vane shaft 52. For example, housing 48 of gearbox 38 or other part of gearbox 38 may be part of a load path between vanes 22 and other structure (e.g., chassis, enclosure 14) of power plant 210.

In reference to FIGS. 2-4, propeller shaft 36 may be rotatably supported by way of one or more bearings fixedly secured to non-rotating structure so as to be rotatable about propeller axis PA. During propulsion of aircraft 28, 128, 228, the rotation of propeller 16 arranged in the tractor configuration may exert a forward force axially along propeller shaft 36 and such forward force may be transferred to airframe 30 to propel aircraft 28, 128, 228. The bearing(s) may include a thrust bearing configured to transfer the forward (i.e., thrust) force exerted by propeller 16 along propeller shaft 36 to the non-rotating structure. In the tractor configuration, an overall axial tensile load may be applied to a portion of propeller shaft 36 that is disposed axially between the thrust bearing and propeller 16. For example, an overall axial tensile load may be applied to a portion of propeller shaft 36 that is aft of propeller 16.

Figure 5:
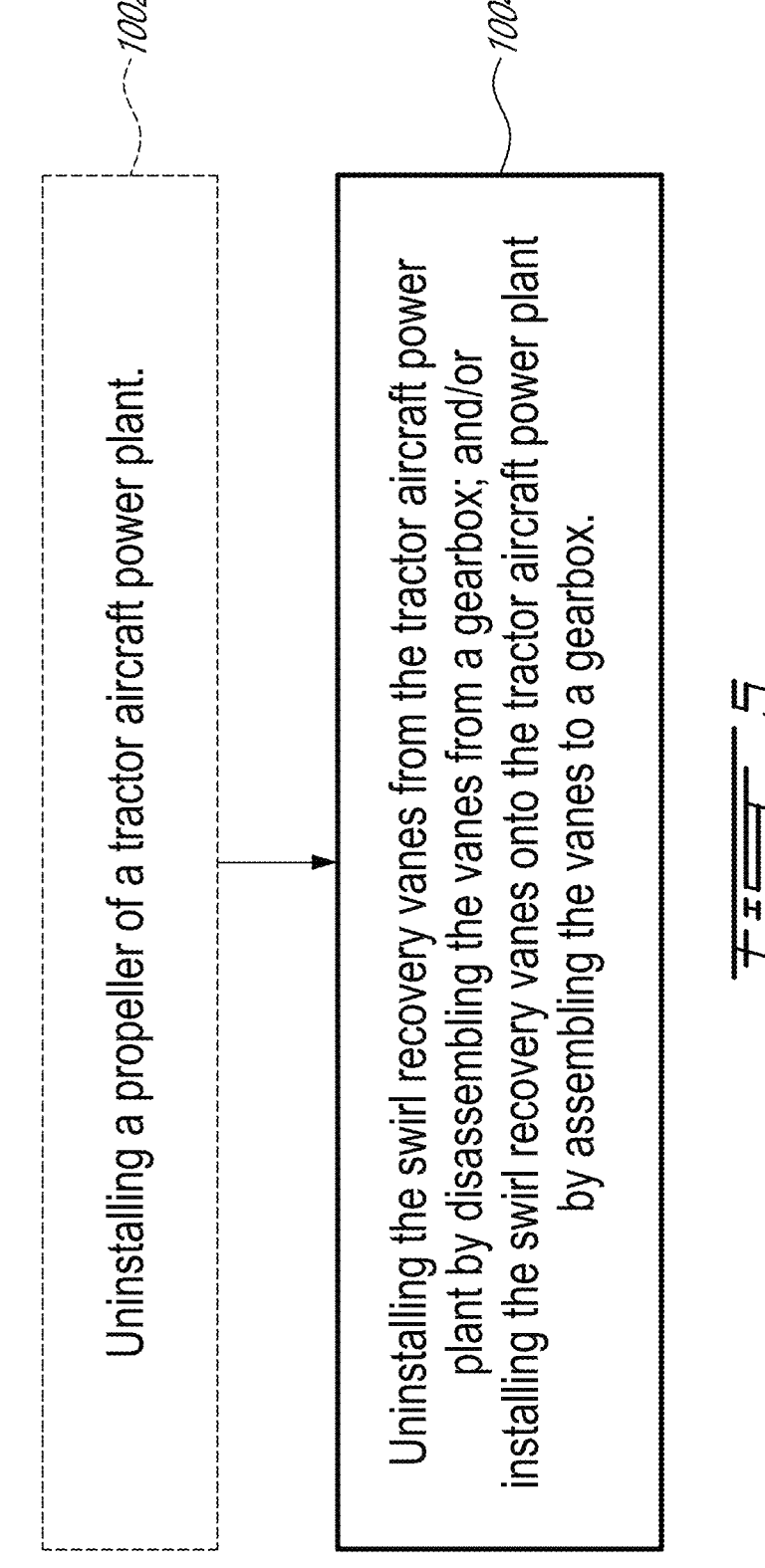
FIG. 5 is a flow diagram of a method of servicing a tractor aircraft power plant.

FIG. 5 is a flow diagram of method 1000 of servicing (i.e., maintaining) a tractor aircraft power plant. Method 1000 may be performed on any one of power plants 10, 110, 210, or on another aircraft power plant having a tractor configuration. Method 1000 may include elements of any one of power plants 10, 110, 210. Method 1000 may include other actions disclosed herein. Method 1000 may be used to service power plant 10, 110, 210 having one or more combustion engines such as Wankel engine 12, enclosure 14 housing Wankel engine 12, propeller 16 drivingly coupled to Wankel engine 12 via gearbox 38, 138, 238 and disposed forward of Wankel engine 12 and a plurality of vanes 22 disposed aft of propeller 16 to interact with a flow of air exiting propeller 16 during rotation of propeller 16. In various embodiments, method 1000 may include: uninstalling vanes 22 from power plant 10, 110, 210 by disassembling vanes 22 from housing 48 of gearbox 38, 138, 238 and/or installing vanes 22 onto power plant 10, 110, 210 by assembling vanes 22 to housing 48 or other part of gearbox 38, 138, 238 (block 1004).

In some embodiments, uninstalling vanes 22 and/or installing vanes 22 may be performed without needing to access enclosure 14 (e.g., nacelle) housing Wankel engine 12. The configurations of power plants 10, 110, 210 may facilitate servicing by facilitating the removal, installation and/or replacement of vanes 22 as a LRU. In other words, the removal, installation and/or replacement of vanes 22 may be performed relatively quickly without requiring extensive disassembly of the remainder of power plant 10, 110, 210. This means that aircraft 28, 128, 228 may quickly return to service while the LRU is being tested and/or repaired. For example, the configuration of the vanes 22 herein may facilitate the removal or installation of vanes 22 without accessing or dismantling of enclosure 14 of power plant 10, 110, 210 in some embodiments.

For example, the removal of vane(s) 22 may include the disassembly (e.g., unfastening) of vane(s) 22 from gearbox 38, 138, or the disassembly (e.g., unfastening) of vane shaft 52 from gearbox 238. The installation of vane(s) 22 may include the assembly (e.g., fastening) of vane(s) 22 with gearbox 38, 138, or the assembly (e.g., fastening) of vane shaft 52 to gearbox 238. In embodiments where vanes 22 have a variable pitch, the removal and/or installation of vane(s) 22 may include the disconnection/connection of vane(s) 22 from/to pitch actuator(s) 60. In some embodiments, the removal and/or installation of vane(s) 22 may optionally include the removal of propeller 16 (block 1002). In some embodiments, the removal and/or installation of vane(s) 22 may optionally include a partial disassembly of gearbox 38, 138, 238.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A tractor aircraft power plant for propelling an aircraft, the tractor aircraft power plant comprising:
   a Wankel engine operable to generate motive power;
   a bladed rotor drivingly coupled to the Wankel engine and being disposed forward of the Wankel engine relative to a propulsion direction of the tractor aircraft power plant;
   a gearbox drivingly coupling the bladed rotor to the Wankel engine; and
   a plurality of vanes angularly distributed about a rotation axis of the bladed rotor and being non-rotatable about the rotation axis of the bladed rotor, the vanes being disposed aft of the bladed rotor to interact with a flow of air propelled by the bladed rotor during rotation of the bladed rotor, the vanes being mounted to the gearbox,
   wherein the gearbox includes a housing and the vanes are mounted to the housing of the gearbox.

2. The tractor aircraft power plant as defined in claim 1, wherein:
   the gearbox is disposed radially inward of the vanes; and
   an axial position of the vanes along the rotation axis of the bladed rotor coincides with an axial position of the gearbox.

3. The tractor aircraft power plant as defined in claim 1, wherein the vanes are pivotally mounted to a radially outer wall of the housing of the gearbox.

4. The tractor aircraft power plant as defined in claim 1, wherein the gearbox is disposed forward of a nacelle housing the Wankel engine.

5. The tractor aircraft power plant as defined in claim 1, wherein:

the Wankel engine is housed inside a nacelle having an air inlet for receiving ambient air therein to facilitate a combustion process of the Wankel engine; and the gearbox is disposed forward of the air inlet.

6. The tractor aircraft power plant as defined in claim 1, wherein:

the Wankel engine has an output shaft for delivering the motive power to the bladed rotor via the gearbox; and the bladed rotor is mounted to a rotor shaft rotatable about the rotation axis of the bladed rotor; and the output shaft and the rotor shaft are coaxial.

7. The tractor aircraft power plant as defined in claim 1, wherein:

the Wankel engine has an output shaft for delivering the motive power to the bladed rotor via the gearbox; and the bladed rotor is mounted to a rotor shaft rotatable about the rotation axis of the bladed rotor; and the output shaft and the rotor shaft are parallel.

8. The tractor aircraft power plant as defined in claim 1, wherein the bladed rotor and the vanes are open.

9. The tractor aircraft power plant as defined in claim 8, wherein the vanes have a variable pitch.

10. A tractor aircraft power plant for generating thrust for propelling an aircraft, the tractor aircraft power plant comprising:

an intermittent combustion engine operable to generate motive power;

a propeller drivingly coupled to the intermittent combustion engine and being disposed forward of the intermittent combustion engine relative to a thrust direction of the tractor aircraft power plant;

a gearbox drivingly coupling the propeller to the intermittent combustion engine; and a circular array of swirl-recovery vanes coaxial with a rotation axis of the propeller and non-rotatable about the rotation axis of the propeller, the swirl-recovery vanes being disposed aft of the propeller to interact with a flow of air exiting the propeller during rotation of the propeller, the swirl-recovery vanes being mounted to a housing of the gearbox.

11. The tractor aircraft power plant as defined in claim 10, wherein the intermittent combustion engine is a Wankel engine.

12. The tractor aircraft power plant as defined in claim 11, wherein the gearbox is disposed forward of a nacelle housing the Wankel engine.

13. The tractor aircraft power plant as defined in claim 11, wherein the housing of the gearbox is disposed centrally of the circular array of swirl-recovery vanes.

14. The tractor aircraft power plant as defined in claim 13, wherein the swirl-recovery vanes are pivotally mounted to a radially outer wall of the gearbox.

15. The tractor aircraft power plant as defined in claim 14, wherein the swirl-recovery vanes have a variable pitch.

16. The tractor aircraft power plant as defined in claim 10, wherein:

the intermittent combustion engine is drivingly coupled to an output shaft for delivering the motive power to the gearbox;

the propeller is mounted to a propeller shaft rotatable about the rotation axis of the propeller and drivingly coupled to the output shaft via the gearbox;

the gearbox provides a speed reduction from the output shaft to the propeller shaft; and the gearbox is disposed centrally of the circular array of swirl-recovery vanes and axially coincident with the swirl-recovery vanes.

17. The tractor aircraft power plant as defined in claim 16, wherein:

the intermittent combustion engine is a Wankel engine; and the swirl-recovery vanes are pivotally mounted to a radially outer wall of the gearbox.

18. A method of servicing a tractor aircraft power plant having an intermittent combustion engine, a bladed rotor drivingly coupled to the intermittent combustion engine via a gearbox and disposed forward of the intermittent combustion engine, and a plurality of swirl-recovery vanes disposed aft of the bladed rotor to interact with a flow of air exiting the bladed rotor during rotation of the bladed rotor, the gearbox including a housing and the swirl-recovery vanes being mounted to the housing of the gearbox, the method comprising:

uninstalling the swirl-recovery vanes from the tractor aircraft power plant by disassembling the swirl-recovery vanes from the housing of the gearbox.

19. The method as defined in claim 18, wherein uninstalling the swirl-recovery vanes is performed without accessing a nacelle housing the intermittent combustion engine.

* * * * *